(12) United States Patent
Maeda

(10) Patent No.: US 9,419,679 B2
(45) Date of Patent: Aug. 16, 2016

(54) CABLE FOR TRANSMITTING SIGNAL

(71) Applicant: SUMITOMO ELECTRIC INDUSTRIES, LTD., Osaka-shi (JP)

(72) Inventor: Yasuhiro Maeda, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/790,710

(22) Filed: Jul. 2, 2015

(65) Prior Publication Data
US 2016/0006479 A1 Jan. 7, 2016

(30) Foreign Application Priority Data

Jul. 7, 2014 (JP) ................................. 2014-139392

(51) Int. Cl.
*H04B 3/04* (2006.01)
*H04B 3/50* (2006.01)

(52) U.S. Cl.
CPC ... *H04B 3/04* (2013.01); *H04B 3/50* (2013.01)

(58) Field of Classification Search
CPC .............. H04B 1/48; H04B 1/52; H04B 1/58; H04B 1/1895; H04B 3/02; H04B 3/03; H04B 3/04; H04B 3/06; H04B 3/50; H04B 3/54; H04B 3/56; H04B 11/00; H04B 11/02; H04B 11/18; H04B 11/1808; H04B 11/1817; H04B 11/20
USPC .......... 375/219, 220, 222, 257; 333/19, 24 R, 333/25, 24 C, 81 A, 219.1, 222, 254, 260
See application file for complete search history.

(56) References Cited

U.S. PATENT DOCUMENTS

| | | | | |
|---|---|---|---|---|
| 6,446,867 B1* | 9/2002 | Sanchez | ............... | G01R 31/002 235/454 |
| 7,974,304 B2* | 7/2011 | Xu | ............... | G06F 13/4286 370/236 |
| 2007/0296461 A1* | 12/2007 | Wong | ............... | H04L 25/0272 326/82 |
| 2011/0012661 A1* | 1/2011 | Binder | ............... | A63H 33/042 327/276 |
| 2012/0012388 A1* | 1/2012 | Horan | ............... | H01B 11/00 174/74 R |
| 2013/0235921 A1 | 9/2013 | Cornelius et al. | | |

FOREIGN PATENT DOCUMENTS

| | | |
|---|---|---|
| JP | 11-232937 A | 8/1999 |
| JP | 2005-135840 A | 5/2005 |

* cited by examiner

*Primary Examiner* — Young T Tse
(74) *Attorney, Agent, or Firm* — Venable LLP; Michael A. Sartori; Laura G. Remus

(57) ABSTRACT

A cable for transmitting signals between two systems is disclosed. The cable provides a connector, which encloses a circuit unit comprising at least one of a transmitter and a receiver and plugged with the system, and a co-axial cable pulled out from the connector. The circuit unit includes at least a transmitter and a receiver. The transmitter receives an input signal in the differential form from the system and outputs a transmitting signal in the single-ended form to the co-axial cable. The receiver receives the transmitting signal in the single-ended form from the co-axial cable and outputs an output signal in the differential form to the system.

12 Claims, 10 Drawing Sheets

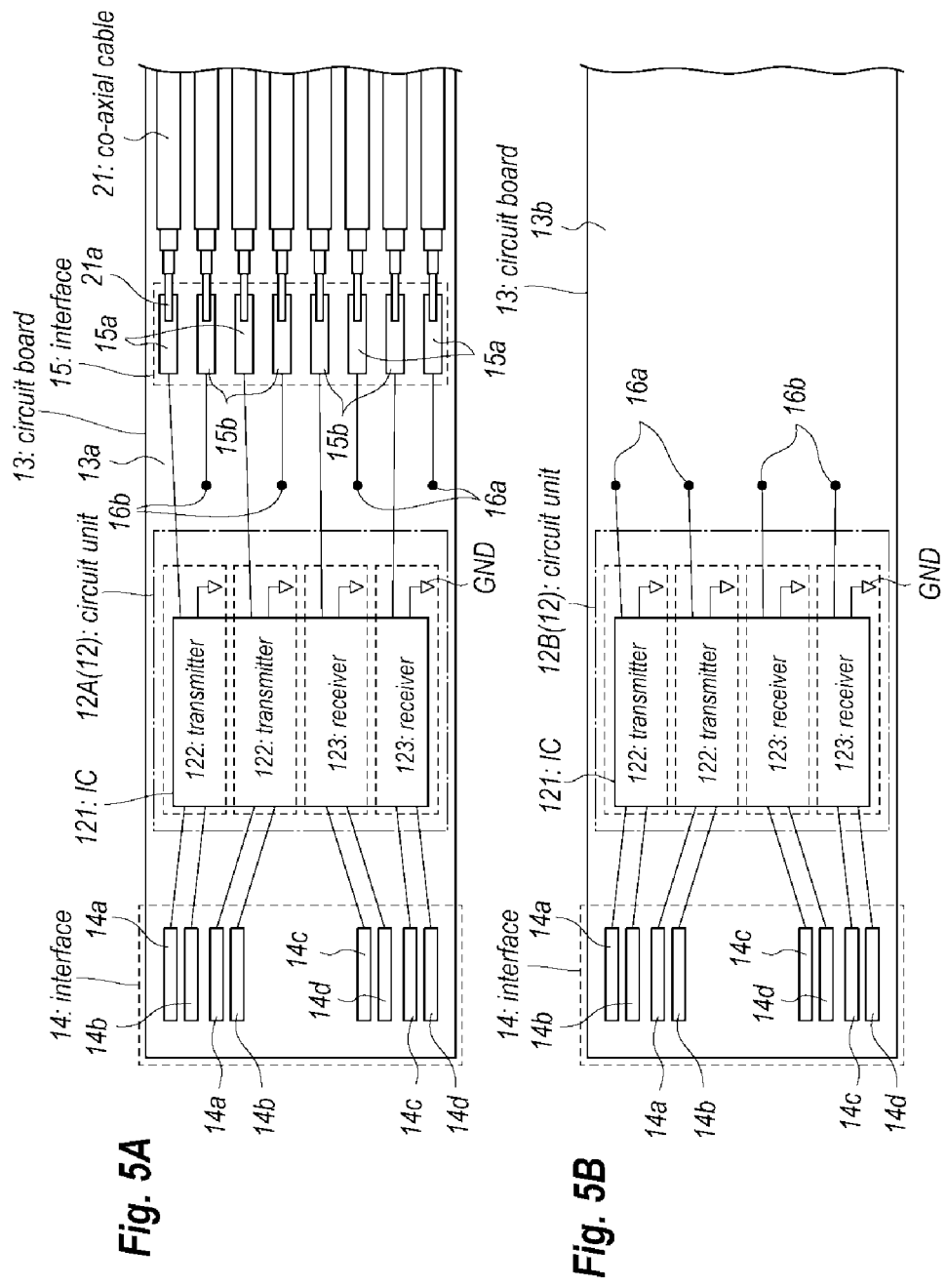

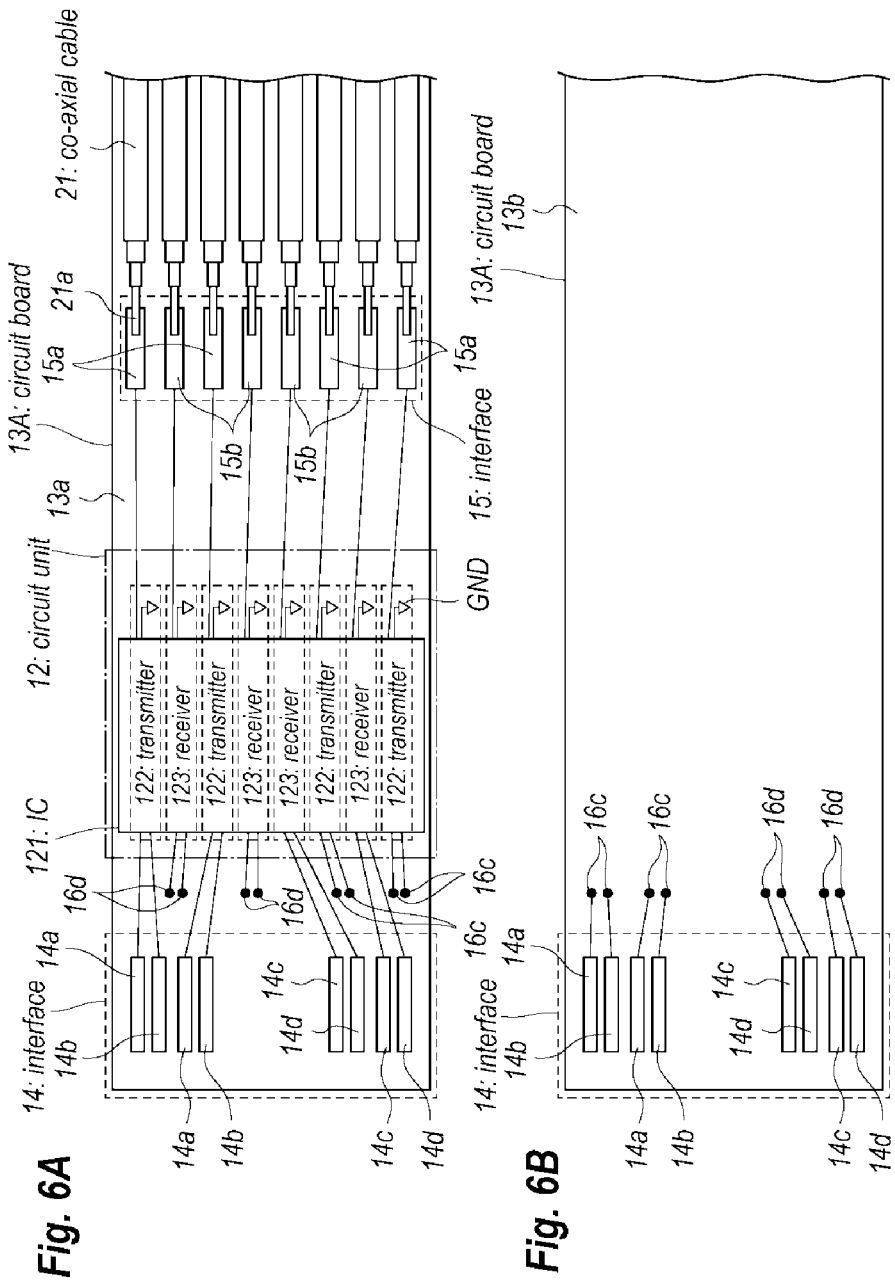

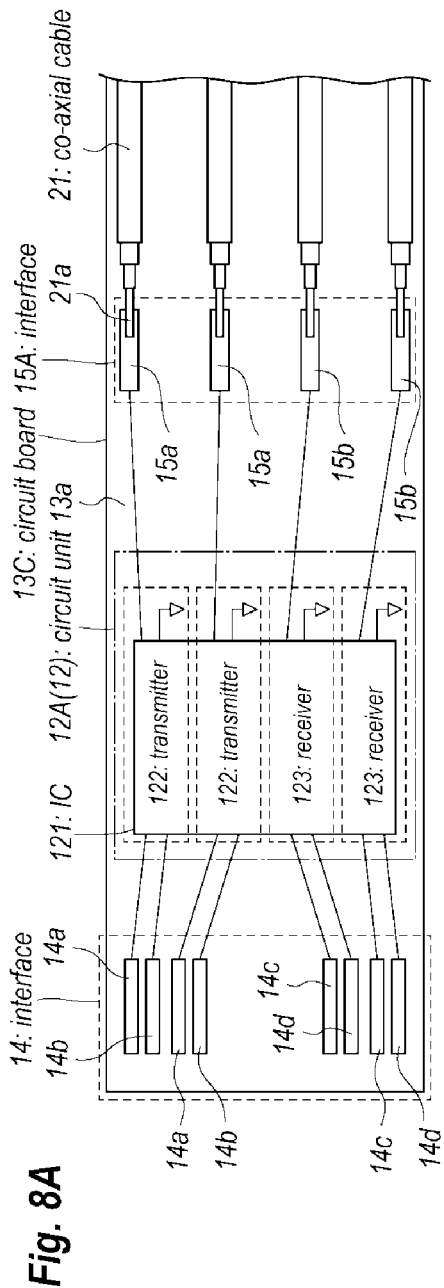
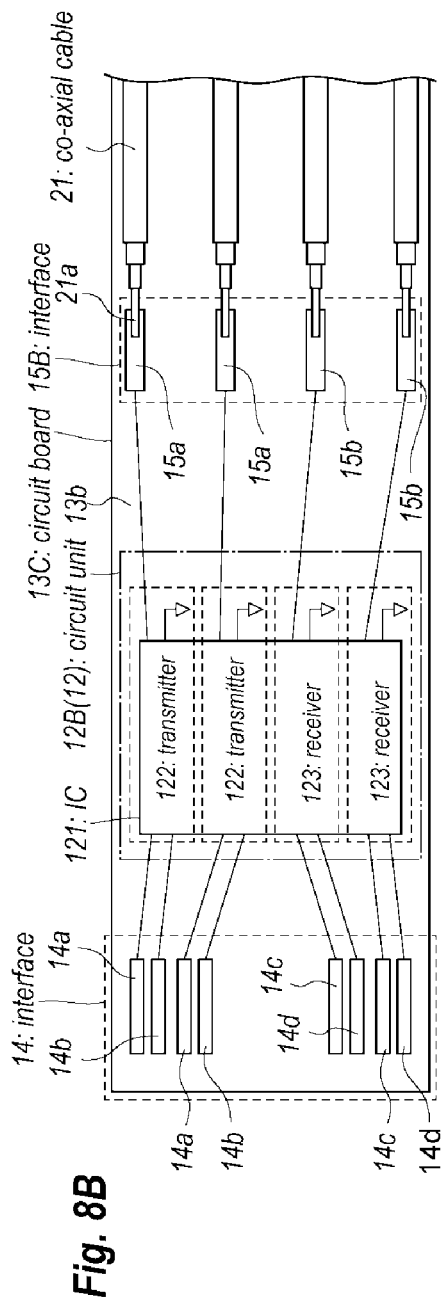
Fig. 8A
Fig. 8B

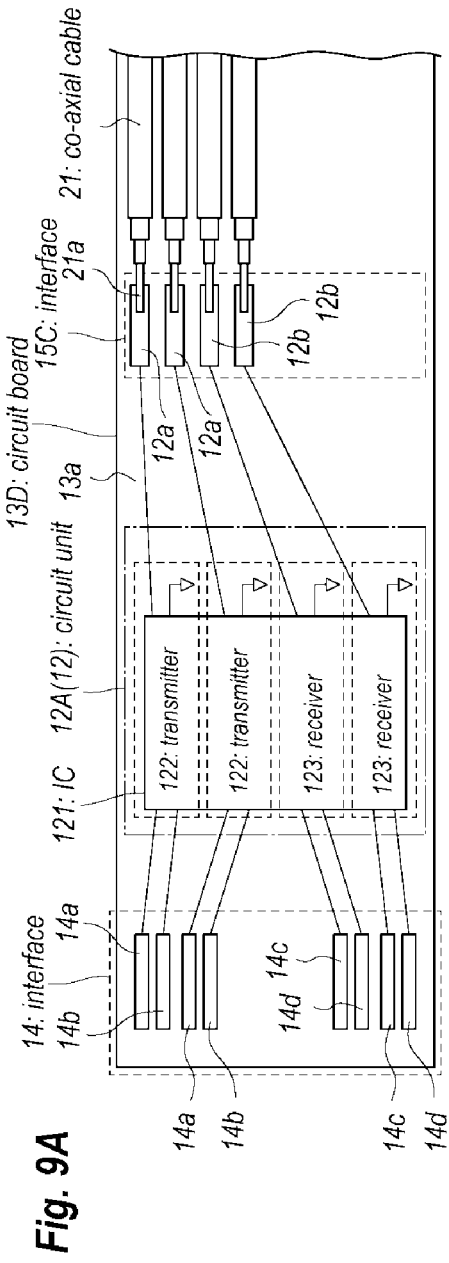
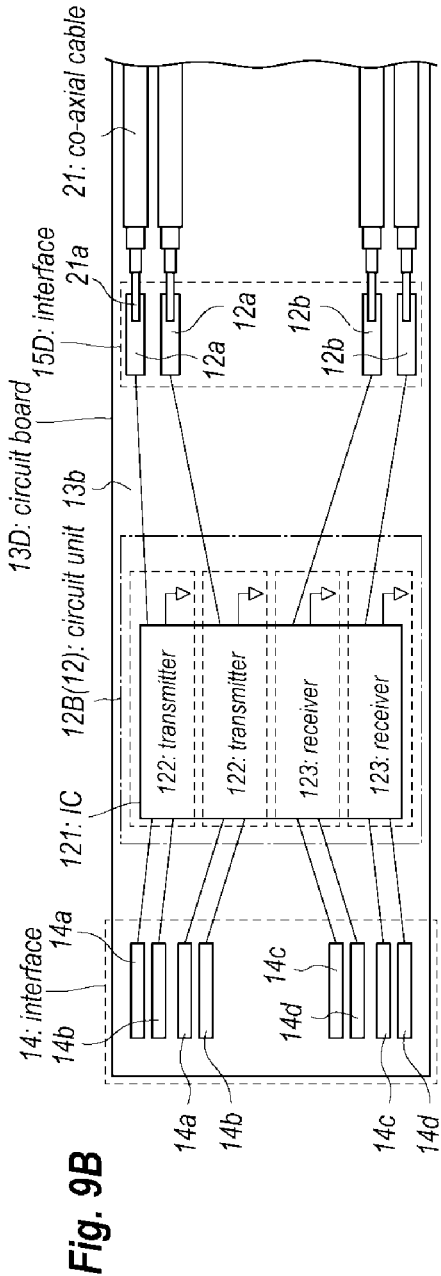
Fig. 9A
Fig. 9B

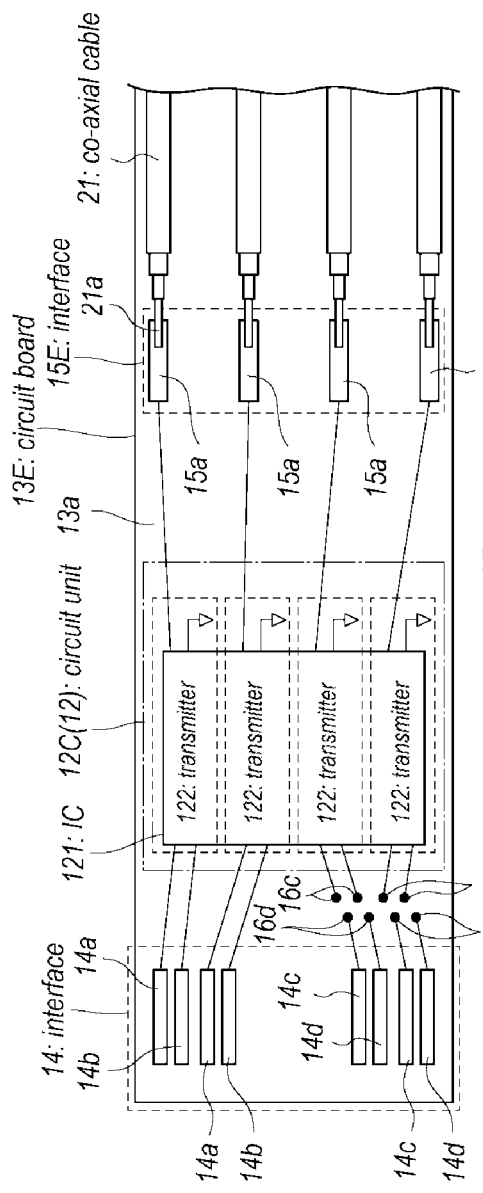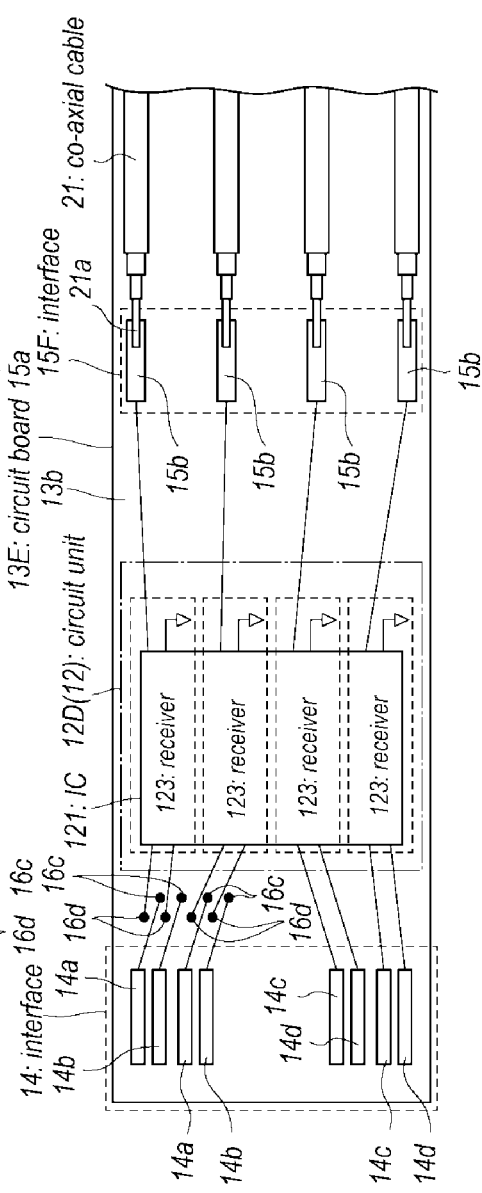
Fig. 10A
Fig. 10B

CABLE FOR TRANSMITTING SIGNAL

BACKGROUND

1. Field of the Invention

The present application relates to a cable for transmitting signals.

2. Background Arts

A Japanese Patent Application laid open No. 2005-135840A has disclosed a cable implemented with connectors in respective ends thereof. The connector disclosed therein includes a function to reshape a receiving signal and/or a transmitting signal.

Recently, one type of a cable for transmitting a signal, which includes in a connector attached to an end thereof a signal processing circuit, such as clock data recovery (CDR) circuit, is preferably applied to the connection between servers, storage, switches, and so on in the data center. Such application has used cables with the type of, the twisted-pair cable, the twin-Ax cable, which is often named as "twinax" cable, and so on with the connector in the end thereof.

SUMMARY OF THE INVENTION

An aspect of the present application relates to a cable for connecting between two apparatuses. The cable comprises a connector and a metal wire. The connector includes a circuit unit electrically connected to one of the apparatuses and plugged to the one of the apparatuses. The metal wire is electrically connected to the circuit unit in the connector. A feature of the cable of the present application is that the circuit unit provides at least one of a transmitter and a receiver. The transmitter receives an input signal in the differential form from the system and generates a transmitting signal in the single-ended form to the metal wire. The receiver receives the transmitting signal in the single-ended form from the metal wire and generates an output signal in the differential form to the apparatus. The connector may further include a circuit board that includes an area, an interface, and another interface. The area disposes the circuit unit thereon. The interface has an electrode electrically connected to the circuit unit and one of the apparatuses. The other interface has a pad electrically connected to the circuit unit and the metal wire.

BRIEF DESCRIPTION OF THE DRAWINGS

The foregoing and other purposes, aspects and advantages will be better understood from the following detailed description of a preferred embodiment of the invention with reference to the drawings, in which:

FIG. 5A views a top surface and FIG. 5B views a back surface of the circuit board according to an embodiment of the present application;

FIGS. 6A and 6B view top and back surfaces, respectively, of another circuit board modified from the circuit board of the embodiment;

FIGS. 8A and 8B view top and back surfaces, respectively, of still another circuit board modified from the embodiment shown in FIGS. 5A and 5B;

FIGS. 9A and 9B view top and back surfaces, respectively, of still another circuit board modified from the embodiment shown in FIGS. 5A and 5B; and FIGS. 10A and 10B view top and back surfaces, respectively, of still another circuit board modified from the embodiment shown in FIGS. 5A and 5B.

DESCRIPTION OF EMBODIMENTS

Some embodiments according to the present application will be described as referring to drawings. However, it is intended that the present invention is not limited to those particular embodiments and modification disclosed, but that the invention include all embodiments falling within the scope of the appended claims. In the description of the drawings, numerals or symbols same with or similar to each other will refer to elements same with or similar to each other without duplicated explanations.

Figure 1:
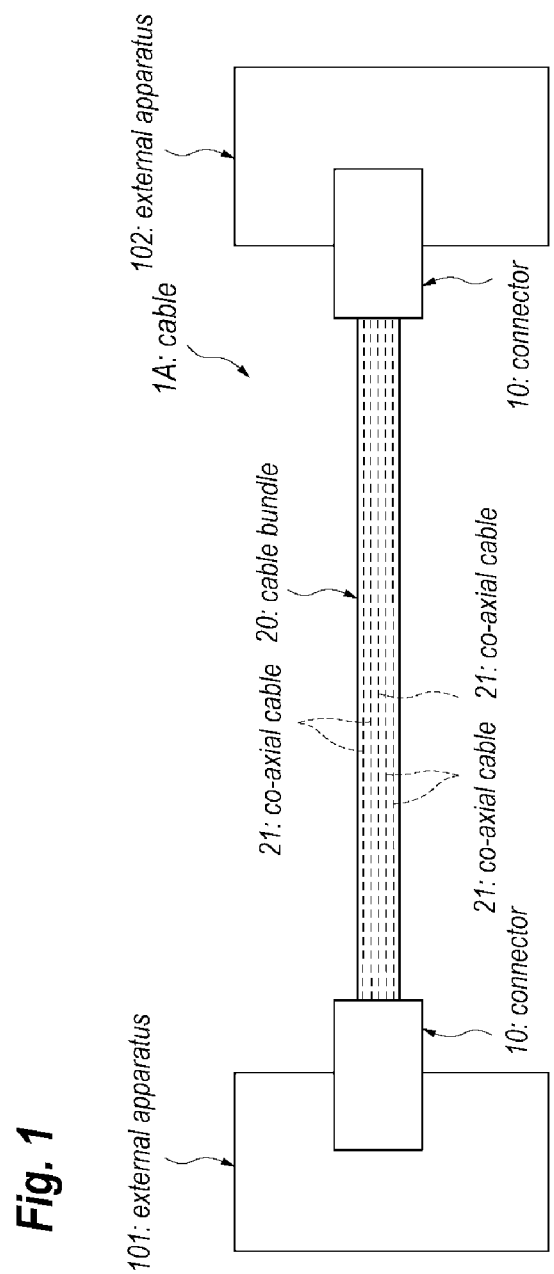
FIG. 1 schematically illustrates a cable for transmitting a signal according to an embodiment of the present application.

FIG. 1 schematically illustrates a cable 1A according to an embodiment of the present invention. As shown in FIG. 1, the cable 1A comprises a cable bundle 20 and two connectors 10 each attached to respective ends of the cable bundle 20. The cable bundle 20 includes a plurality of co-axial cables 21. One of connectors 10 is to be plugged with an external apparatus 101 and electrically connected to the external apparatus 101. The other connector 10 is also to be plugged with other external apparatus 102 to constitute the electrical connection thereto.

Figure 2:
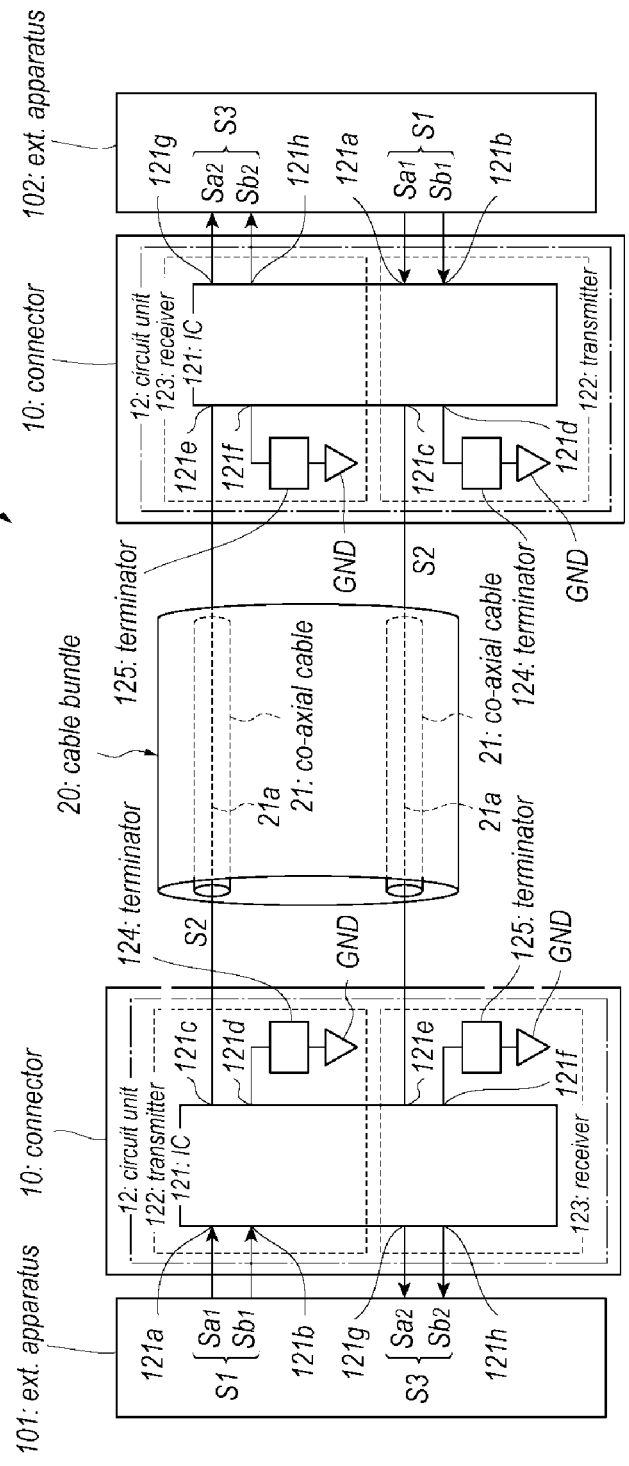
FIG. 2 shows a functional block diagram of a portion of the cable shown in FIG. 1.

FIG. 2 schematically shows a functional block diagram of the cable 1A. Two connectors 10 each provides a circuit unit 12, which may include a signal shaper such as a clock data recovery (CDR), a repeater, and so on, having a type of an integrated circuit (IC) 121. The circuit unit 12 in one of the connector 10 is electrically connected to the external apparatus 102 by plugging the connector 10 with the external apparatus 101, and the circuit unit 12 in the other of the connector 10 is also coupled with the external apparatus 101 by plugging the other connector 10 with the external apparatus 102.

The circuit unit 12 includes a transmitter 122 and a receiver 123, where the transmitter 122 constitutes a part of the IC 121, receives an input signal S1 in a pair of input terminals, 121a and 121b. The input signal S1 has the arrangement of the differential signal comprising a positive phase signal Sa1 and a negative phase signal Sb1. The transmitter 122 also provides a terminator 124 which may be a combined circuit of a capacitor and a resistor with resistance of 50 ohm, connected between one of output terminals, 121c and 121d, and the ground GND. The terminator 124 may be connected from the one of the output terminals, 121c and 121d, and a power line.

The transmitter 122 reshapes the input signal S1 and outputs the reshaped signals to the paired output terminals, 121c and 121d, differentially. Because one of the output terminals 121d is terminated by the terminator 124, one of the positive phase signal and the negative phase signal is not transmitted. The other of the output terminals 121c is connected to one of co-axial cables 21 in the cable bundle 20. The one of the output terminals 121c may be electrically connected to the metal wire 21a of the co-axial cable through a coupling capacitor. The transmitted signal S2 is the single-ended signal including one of the positive phase signal Sa1 and the negating phase signal Sb1. The transmitted signal S2 is carried to the other connector 10 through the co-axial cable 21.

The receiver 123, which is also involved within the IC 121, provides a pair of input terminals, 121e and 121f. One of the input terminals 121e is coupled with the metal wire 21a of the co-axial cable 21 through a coupling capacitor not illustrated in the figures. The other of input terminals 121f is grounded through the terminator 125 that includes a resistor and a capacitor. The input terminal 121f may be terminated to the power line. Thus, the IC 121 receives in one of the input terminals 121e the transmitted signal S2, which is the single-ended signal, from the other connector 10 through the co-axial cable 21.

The receiver 123 in the IC 121 re-shapes the transmitted signal S2 and provides an output signal S3 in the pair of output terminals, 121g and 121h, to the external apparatuses, 101 or 102. The output signal S3 has the arrangement of the differential signal including the positive phase signal Sa2 and the negative phase signal Sb2. FIG. 2 illustrates an arrangement of the circuit unit 12 including both of the transmitter 122 and the receiver 123. However, the circuit unit 12 may provide only one the transmitter 122 and the receiver 123. For instance, the arrangement, where the circuit unit 12 in one of the connectors 10 provides only the transmitter 122, while, the circuit unit 12 in the other connector 10 provides only the receiver 123, may be applicable to the cable 1A.

Figure 3:
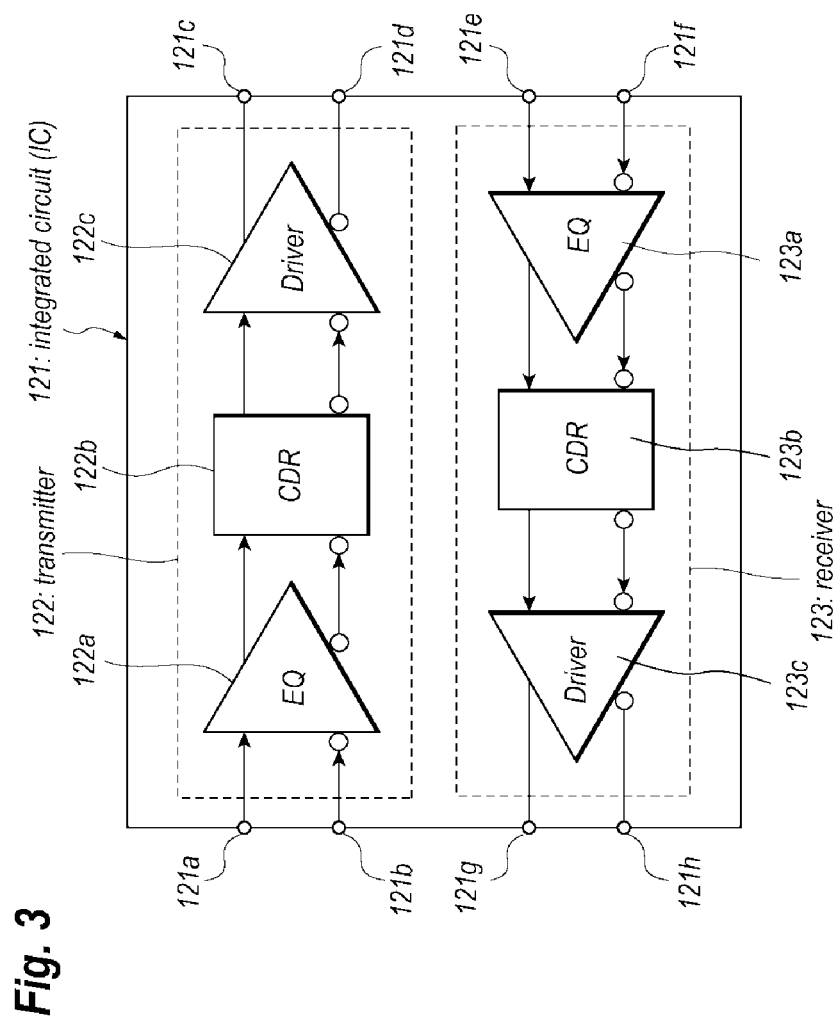
FIG. 3 shows a functional block diagram of a retiming circuit as an example of the circuit unit of the present application.

FIG. 3 shows an exemplary block diagram of the IC 121 implemented within the cable 1A. The transmitter 122 in the IC 121 may provide an equalizer 122a, a clock data recovery (CDR) 122b, and a driver 122c, where all of them are connected in series and have the differential arrangement. The differential input of the equalizer 122a is connected to the input terminals, 121a and 121b, of the IC 121, and the differential output of the equalizer 122a is connected to the differential input of the CDR 122b, the differential output of the CDR 122b is connected to the differential input of the driver 122c, and the differential output of the driver 122c is connected to the pair of output terminals, 121c and 121d.

The receiver 123 in the IC 121 also comprises an equalizer 123a, a CDR 123b, and a driver 123c, each having the differential arrangement and connected in series between the pair of input terminals, 121e and 121f, and the pair of the output terminals, 121g and 121h. In an example shown in FIG. 3, the IC has the arrangement of, what is called, the re-timing circuit. However, the IC may have other types of the signal re-shaping circuit such as a repeater. When the IC has the arrangement of the repeater, the CDRs implemented in the re-timing circuit shown in FIG. 3 may be removed.

Figure 4:
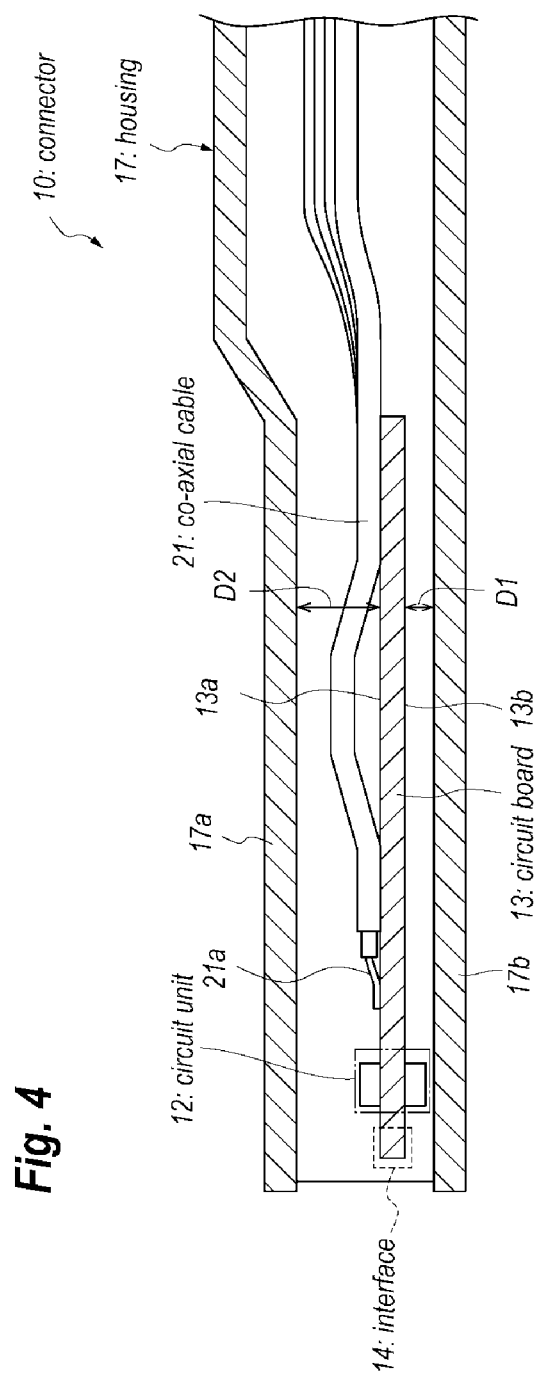
FIG. 4 is a side cross section of an example of the connector of the present application.

FIGS. 4 and 5 show the arrangement of the connector 10, where FIG. 4 is a side cross section of the connector 10, while FIGS. 5A and 5B are top and bottom views of the connector 10.

The connector 10 of the present embodiment further includes a circuit board 13 having a rectangular substrate made of dielectric material and interconnections provided on both of a top surface 13a and a back surface 13b of the dielectric substrate. The circuit board 13 demarcates an area to which the circuit unit 12 is assembled from other areas to which an interface 14 to the external apparatuses, 101 or 102, is provided.

The present embodiment shown in FIGS. 5A and 5B provides the circuit units in both of the top surface 13a and the back surface 13b of the circuit board 13. Specifically, a part of the circuit unit 12A is mounted on the top surface 13a, while, another part of the circuit unit 12B is mounted on the back surface 13b. As shown in FIG. 5A, the part of the circuit unit 12A constitutes one IC 121 that includes two transmitters 122 and two receivers 123. On the other hand, another part of the circuit unit 12B constitutes another IC 121 that also includes two transmitters 122 and two receivers 123. FIGS. 5A and 5B omit the terminators 124 and 125 attributed to the circuit units, 12A and 12B.

The interface 14 includes a plurality of electrodes, 14a to 14d, in both of the top surface 13a and the back surface 13b. Specifically, the top surface 13a provides two pairs of the electrodes, 14a and 14b, and two pairs of another electrodes, 14c and 14d. The former pairs of the electrodes, 14a and 14b, may be those for the input signals S1 and connected to the input terminals, 121a and 121b, of the transmitter 121 corresponding thereto. The later pairs of the electrodes, 14c and 14d, may be those for the output signals S3 and connected to the output terminals, 121g and 121h, of the receiver 123 corresponding thereto. FIGS. 5A and 5B only illustrate the electrodes for the input and output signals, and omit other electrodes for the ground and the power lines.

The other interface 15, which is disposed on the top surface 13a of the circuit board 13, provides four pads 15a and another four pads 15b. These pads, 15a and 15b, which are electrically connected with respective ends of the metal wire 21a of the co-axial cable 21, have a width 1.2 to 2.0 times greater than a diameter of the metal wire 21a and a gap to the next pads greater than the width thereof.

The former pads 15a may be those for the transmitter and two of them are connected by the AC mode to the output terminal 121c of the transmitter 122 in the part 12A of the circuit unit 12, while, other two are connected also in the AC mode to the output terminal 121c of the transmitter in another part 12B of the circuit unit 12 as interposing via holes 16a. The latter pads 15b may be those for the receiver. Two of the latter pads 15b are connected in the AC mode to the input terminal 121e in the part 12A of the circuit unit 12, while, other two of the latter pads 15b are connected also in the AC mode to the input terminal 121e in another part 12B of the circuit unit 12 through via holes 16b.

Referring to FIG. 4, the connector 10 further provides a housing 17 to enclose the circuit unit 12 and the circuit board 13 therein. The housing 17 has a parallelepiped arrangement along the longitudinal direction of the circuit board 13 and having a lid 17a facing the top surface 13a of the circuit board 13 and a bottom 17b facing the back surface 13b of the circuit board 13. The housing 17 provides a front opening to constitute an electrical connector accompanied with the interface 14. The co-axial cables 21 are guided from the rear of the housing 17. In the embodiment shown in FIG. 4, a distance from the bottom 17b of the housing 17 to the back surface 13b of the circuit board is shorter than a distance from the lid 17a of the housing 17 to the top surface 13a of the circuit board 13. That is, the circuit board 13 is set in the housing 17 offset from the center thereof in the vertical direction.

Advantages of the cable 1A will be described. The external apparatuses, 101 or 102, generally processes information by differential signals and outputs these differential signals. The cable 1A of the embodiment in the transmitter 122 receives the input signal S1 as the differential signal from the external apparatuses, 101 or 102, and carries the differential signal as the transmitted signal S2 by the single-ended signal on the co-axial cable 21. The cable 1A in the receiver 123 receives thus carried transmitted signal S2 as the single-ended signal and generates the output signal S3 as the differential signal. Thus, the transmitted signal S2 is transmitted on the signal metal line as the single-ended signal; accordingly, this arrangement becomes free from the skew between two signals constituting the differential signal. The skew between two signals results in the transmission loss.

Also, the single metal line like the co-axial cable 21 comparing with, for instance, a twisted pair cable and/or a twin-Ax cable, makes it possible to form the cable 1A in further flexible and slim. Accordingly, the cable 1A between two external apparatuses, 101 and 102, may enhance the workability of the installation. Moreover, when the signal metal cable has a core cross section substantially equal to sum of core cross sections of the twisted pair cable, or the twin-Ax cable, the transmission loss of the transmitted signal S2 may be reduced because of the reduction of the series resistance. A communication with a longer haul becomes available.

The metal wire 21a of the co-axial cable 21, like the present arrangement, may be directly connected to respective output terminals, 121c and 121e of the circuit unit 12 without interposition other electrical components, such as a balun, a common mode choke, and so on to transmit the differential signal. Accordingly, the cable 1A of the embodiment not only becomes free from the loss due to those electronic components, but the connector may be formed in compact.

The transmitter 122 of the present embodiment provides the pair of output terminals, 121c and 121d, one of which is terminated to the ground GND through the terminator 124 and the other is connected to the metal wire 21a of the co-axial cable 21. This arrangement effectively brings the function to convert the input signal S1 with the differential mode into the transmitted signal S2 of the single-ended arrangement.

Also, the receiver 123 of the present embodiment provides the pair of input terminals, 121e and 121f, one of which receives the transmitted signal S2, while, the other is grounded. This arrangement preferably realizes the function to convert the transmitted signal S2 with the single-ended arrangement into the output signal S3 of the differential arrangement.

The connector 10 provides the circuit board 13 that demarcates the area for mounting the circuit unit 12 from the interfaces, 14 and 15, the latter of which provides the pads, 15a and 15b. This arrangement of the connector 10 preferably realizes the mechanism to electrically connect the external apparatuses, 101 and 102, the circuit unit 12, and the co-axial cable 21.

The part 12A of the circuit unit 12 is mounted on one of the surface, namely, the top surface 13a of the circuit board, while, the other part 12B of the circuit unit 12 is mounted on another of the surface, namely, the back surface 13b of the circuit board 13. Thus, the circuit board 13 may provide enough room to mount the circuit unit 12, which enables the interconnections on the circuit board 13 to wire with widened spaces and to reduce the crosstalk between the interconnections.

The interface 14 may provide electrodes on the top surface 13a of the circuit board 13 and other electrodes on the other surface, namely, the back surface 13b of the circuit board 13. The former electrodes are electrically connected to the part 12A of the circuit unit 12, while, the latter electrodes are electrically connected to the other part 12B of the circuit unit 12. Thus, the electrodes in the interface 14 may be connected to the circuit unit 12 in respective surfaces, 13a and 13b, of the circuit board 13 without interposing via holes.

The pads, 15a and 15b, may be provided in only one of surfaces, 13a or 13b, of the circuit board 13. This arrangement of the pads, 15a and 15b, enables the co-axial cable 21 in the metal wires thereof to be fixed to respective pads, 15a and 15b, by the single side soldering, which may enhance the efficiency of the soldering process.

The circuit board 13 is set within the housing such that a distance from the back surface 13b thereof to the housing 17 is shorter than a distance from the top surface 13a to the housing 17; that is the circuit board 13 is offset in the vertical direction from the middle of the housing. In a conventional arrangement of the cable, in particular, the conventional arrangement of the circuit board in the connector, the co-axial cables are fixed to the circuit board in both of the top and back surfaces. When the circuit board 13 is offset form the vertical midway of the housing 17, the surface closer to the housing possibly becomes hard to assemble electronic components thereon. The present embodiment, however, the co-axial cables 21 are fixed only to the top surface 13a of the circuit board 13. Accordingly, the back surface 13b, which is closer to the housing 17, may be left to mount electronic components thereon.

(First Modification)

FIGS. 6A and 6B are plan views of the circuit board 13A modified from the aforementioned circuit board 13, where FIG. 6A shows the top surface 13a, while, FIG. 6B shows the back surface 13b thereof. The description below is only for features distinguishable from those of the aforementioned embodiment, and portions not described below are substantially same with those shown in FIG. 5.

The circuit board 13A of the modified embodiment provides the area to mount the circuit unit 12 only in one of the top surface 13a and the back surface 13b. That is, the whole circuit unit 12 is mounted in the top surface 13a. As illustrated in FIG. 6A, the circuit unit 12, which is constituted by a unique IC 121 that includes four transmitters 122 and four receivers 123. FIGS. 6A and 6B omit the terminators, 124 and 125.

The electrodes, 14a and 14b, provided on the top surface 13a in the interface 14 are connected to the input terminals, 121a and 121b, of the transmitter 122 corresponding thereto. Similarly, the electrodes, 14c and 14d, formed on the top surface 13a in the interface 14 are coupled with the output terminals, 121g and 121h, of the receiver 123 corresponding thereto. The electrodes, 14a and 14b, provided in the back surface 13b in the interface 14 are connected to the input terminals, 121a and 121b, of the transmitter 122 corresponding thereto through the via holes 16c. Similarly, the electrodes, 14c and 14d, formed on the back surface 13b in the interface 14 are connected to the output terminals, 121g and 121h, of the receiver 123 through the via holes 16d. The pads 15a for the transmission are connected in the AC mode to the output terminals 121c of the transmitter 122 only in the top surface 13a, while, the pads 15b for the reception are connected in the AC mode to the input terminals 121e of the receiver 123 only in the topo surface 13a.

The arrangement of the modified embodiment shown in FIGS. 6A and 6B may also enhance the workability of the installation of the cable connecting two external apparatuses, 101 and 102, but may suppress the transmission loss due to the skew between two signals whose phases are opposite to each other. Moreover, the embodiment shown in FIGS. 6A and 6B installs the whole circuit unit 12 only in one of surfaces 13a of the circuit board 13A, which not only makes the assembly for mounting the circuit unit 12 on the circuit board 13A simple and shortens the process thereof, but also widens the area to mount other electrical components on the back surface 13b.

The electrodes, 14a to 14d, in the interface 14 may be formed in each surfaces, 13a and 13b, of the circuit board 13A, and those electrodes, 14a to 14d, are electrically connected to the circuit unit 12 mounted on the top surface 13a. Even in such an arrangement of the electrodes, 14a to 14d, and the circuit unit 12 may show the advantages described above.

(Second Modification)

Figure 7A:
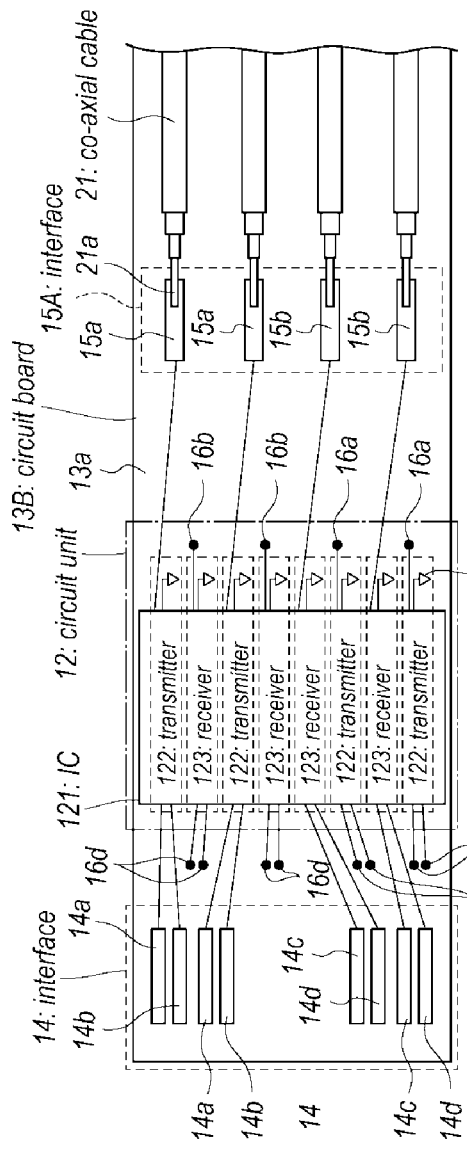
FIGS. 7A and 7B view top and back surfaces, respectively, of still another circuit board also modified from the embodiment shown in FIGS. 5A and 5B.
Figure 7B:
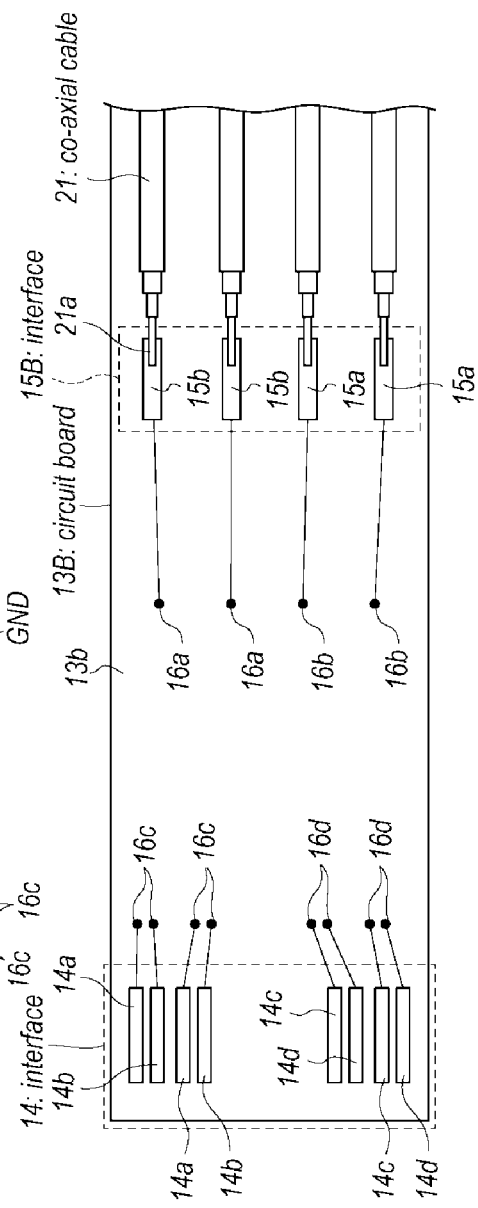

FIGS. 7A and 7B are plan views of the circuit board 13B according to the second modification of the first embodiment shown in shown in FIGS. 5A and 5B, where FIG. 7A illustrates the top surface 13a, while, FIG. 7B shows the back surface 13b of the circuit board 13B. Explanations below concentrate on points distinguishable from former embodiment and modification, and arrangements not explained are substantially same with those shown in FIGS. 5A to 6B.

The circuit board 13B of the present modification provides interfaces, 15A and 15B, substituted from the interface 15. The former interface 15A, which is provided on the top surface 13a, has two pads 15a and other two pads 15b. Also, the interface 15B provided in the back surface 13b, has two pads 15a for the transmission and other two pads 15b for the reception. Two pads 15a in the first interface 15A are connected in the AC mode to the output terminals 121c of the transmitter 122 corresponding thereto through the interconnection of the top surface 13a. Two pads 15a in the second interface 15B are connected in the AC mode to the output terminals 121c of the transmitter 122 corresponding thereto through the interconnection on the back surface 13b and the via holes 16b. Two pads 15b in the top interface 15A are connected in the AC mode to the input terminals 121e of the receiver 123 corresponding thereto through the interconnection on the top surface 13a, while, two pads 15b in the back interface 15B are connected also in the AC mode to the input terminals 121e of the receiver 123 corresponding thereto through the interconnection on the back surface 13b and the via holes 16a.

The arrangement thus described, similar to the aforementioned arrangements, not only enhance the workability of the installation of the cable 10 connecting two external apparatuses, 101 and 102, but may suppress the transmission loss due to the skew between two signals whose phases are opposite to each other. Also, the arrangement shown in FIGS. 7A and 7B provides the pads, 15a and 15b, for the transmission and the reception in both of top and back surfaces, 13a and 13b, of the circuit board 13B, which enables to widen a space between pads and metal wires 21a and to reduce the crosstalk between the pads and/or metal wires.

Two types of the crosstalk should be considered, one of which is between the input signals S1 or between the output signals S3, and another is between the input signal S1 and the output signal S3. The former crosstalk is often called as the far end crosstalk (FEXT), and the latter is called as the near end crosstalk (NEXT). The arrangement to widen the space between the pads and the metal wires is effective to reduce both types of the crosstalk.

(Third Modification)

FIGS. 8A and 8B are views of the top surface and the back surface of the circuit board 13C according to the third modification. Similar to the description for the former modifications, the description below concentrates on points distinguishable from those of the aforementioned modifications, and the arrangements not explained are substantially same with or similar to those of the aforementioned modifications.

The circuit board 13C of the present modification provides, instead of the interface 15 in the side of the co-axial cable 21, the top interface 15A in the top surface 13a and the back interface 15B in the back surface 13b. Each interfaces, 15A and 15B, provides two types of pads, 15a and 15b. Two pads 15a for the transmission in the top interface 15A are connected in the AC mode to the output terminals 121c of the transmitter 122 corresponding thereto in the top surface 13a of the circuit board 13C; also, the pads 15a for the transmission in the back interface 15B are connected in the AC mode to the transmitter 122 in the back surface 13b. Two pads 15b for the reception on the top interface 15A are connected in the AC mode to the input terminals 121e of the receiver 123 in the top surface 13a, while, the pads 15b for the reception in the back interface 15B are connected in the AC mode to the input terminals 121e of the receiver 123 but in the back surface 13b of the circuit board.

The arrangement thus described as referring to FIGS. 8A and 8B, similar to the aforementioned arrangements, not only enhance the workability of the installation of the cable 10 connecting two external apparatuses, 101 and 102, but may suppress the transmission loss due to the skew between two signals whose phases are opposite to each other. Also, two types of pads, 15a and 15b, are provided in both surfaces, 13a and 13b, of the circuit board 13C, which may widen the space between the pads and metal wires 21a to reduce the crosstalk between the pads and the metal wires 21a.

(Fourth Modification)

FIG. 9A is a plan view of the top surface 13a and FIG. 9B is a plan view of the back surface 13b of the circuit board 13D according to the fourth modification of the invention. Similar to the aforementioned modifications, the explanation below concentrates on points different from those of the aforementioned one, and left points not explained are substantially same with those of the former embodiments.

The circuit board 13D of the present modification provides, substituted from the interfaces, 15A and 15B, a top interface 15C and a back interface 15D. The top interface 15C provides two pads 15a for the transmission and other two pads 15b for the reception. A feature of the top interface 15C of the present modification is that these pads, 15a and 15b, are arranged close to one edge of the circuit board 13D to form a room along the other edge opposite to the one edge, that is, the pads, 15a and 15b, are unevenly arranged on the top surface 13a. Accordingly, these pads, 15a and 15b, in the top interface 15C have spaces to the next pads narrower than those of the former modification 13C shown in FIG. 8A.

Also, the back interface 15D provides two pads 15a for the transmission and the other two pads 15b for the reception. A feature of the arrangement of these pads, 15a and 15b, in the back interface 15D is that a portion of the pads, namely the pads 15a for the transmission, are arranged along one edge of the circuit board 13D, while, another portion of the pads, namely the pads 15b for the reception, are disposed along another edge of the circuit board 13D, namely, the pads, 15a and 15b, are also unevenly arranged in the back surface 13b of the circuit board. Accordingly, a wide room is left between the pads in a center portion of the circuit board 13D. The room between the pads may dispose other electronic components.

(Fifth Modification)

FIG. 10A is a plan view of the top surface 13a; while, FIG. 10B is a plan view of the back surface 13b of the circuit board 13E according to the fifth modification of the invention. Similar to the aforementioned modifications, the explanation below concentrates on points different from those of the aforementioned one, and left points not explained are substantially same with those of the former embodiments.

The circuit board 13E of the present modification provides, instead of the parts, 12A and 12B, of the circuit unit 12, other parts, 12C and 12D, of the circuit unit 12. The part 12C is mounted on the top surface 13a of the circuit board 13E, while, another part 12D is provided in the back surface 13b of the circuit board 13E. Each parts, 12C and 12D, constitutes respective ICs. Specifically, the former part 12C includes four transmitters 122, while, the latter part 12D includes four receivers 123.

The electrodes, 14a and 14b, in the interface 14 of the top surface 13a are connected to the input terminals, 121a and 121b, of the transmitter corresponding thereto through the interconnections on the top surface 13a. The electrodes, 14a and 14b, in the interface 14, which are provided on the back surface 13b, are connected to the input terminals, 121a and 121b, of the transmitter 122 in the top surface 13a through the via holes 16c. The electrodes, 14c and 14d, in the interface 14 of the top surface 13a are connected to the output terminals, 121g and 121h, of the receiver 123 provided in the back surface 13b through the via holes 16d, and the electrodes, 14c and 14d, in the interface 14 of the back surface 13b are connected to the output terminals, 121g and 121h, of the receiver 123 in the back surface 13b.

For the interface 15 to the co-axial cables 21, the circuit board 13E of the present modification provides the interfaces, 15E and 15F, the former of which is disposed in the top surface 13a and the latter is in the back surface 13b. The interface 15E includes four pads 15a for the transmission and the other interface 15F also provides four pads 15b but for the reception. The pads 15a are connected in the AC mode to the output terminals 121c of the transmitters 122 in the topo surface 13a. The pads 15b in the interface 15F are connected in the AC mode to the input terminals 121e of the receivers 123 in the other part 12D of the circuit unit 12.

In the present modification, the whole transmitters 122 are provided in one of the surfaces 13a of the circuit board 13E, and the whole receivers 123 are disposed in another of the surfaces 13b of the circuit board 13E. Even for such an arrangement, the advantages same as those of the aforementioned examples may be obtained. Moreover, the components for the transmission and those for the reception are fully isolated by the circuit board 13E. Specifically, the pads 15a for the transmission and the transmitters 122 are arranged in one surface 13a of the circuit board 13E, while, the pads 15b for the reception and the receivers 123 are disposed in another surface 13b. Such an arrangement may effectively suppress the near end crosstalk (NEXT). Moreover, when the electrodes, 14a and 14b, for the transmission are arranged on the one surface 13a and the other electrodes, 14c and 14d, for the reception are arranged in the other surface 13b, which may remove the via holes 16c and 16d, may further suppress the NEXT.

The cable according to the present invention thus described is not restricted to those embodiments or modifications, and may further modify in various ways. For instance, the transmitter and/or the receiver in the circuit unit terminate one of the outputs or one of the inputs thereof to the ground or the power line through the terminator. However, the method to convert a differential signal into a single-ended signal is not restricted to this arrangement. An active circuit, such as the single-ended push-pull, or the like may be also utilized in the conversion. Accordingly, the appended claims are intended to encompass all such modifications and changes as fall within the true spirit and scope of this invention.

What is claimed is:

1. A cable for connecting between two apparatuses, comprising:
   a connector including a circuit unit electrically connected to one of the apparatuses, the connector being plugged to the one of the apparatuses; and
   a metal wire electrically connected to the circuit unit in the connector,
   wherein the circuit unit provides at least one of a transmitter and a receiver, the transmitter receiving an input differential signal from the one of the apparatuses and generating a transmitting single-ended signal to the metal wire, the receiver receiving the transmitting single-ended signal from the metal wire and generating an output differential signal to the one of the apparatuses, and
   wherein the connector further includes a circuit board having an area on which the circuit unit is disposed, an interface having an electrode electrically connected to the circuit unit and the one of the apparatuses, and another interface having a pad electrically connected to the circuit unit and the metal wire.

2. The cable of claim 1,
wherein the metal wire is connected to the transmitter or the receiver in an AC mode.

3. The cable of claim 1,
wherein the transmitter includes a pair of output terminals, one of the output terminals being terminated and another of the output terminals being connected in an AC mode to the metal wire.

4. The cable of claim 1,
wherein the receiver includes a pair of input terminals, one of the input terminals being terminated and another of the input terminals being connected to the metal wire.

5. The cable of claim 1,
wherein the circuit unit includes a part disposed on one surface of the circuit board and another part disposed on another surface of the circuit board opposite to the one surface thereof.

6. The cable of claim 5,
wherein the interface includes a plurality of electrodes, a part of the electrodes being arranged on the one surface of the circuit board and another part of the electrodes being arranged on the another surface of the circuit board opposite to the one surface thereof, and
wherein the part of the electrodes are electrically connected to the part of the circuit unit, and the another part of the electrodes are electrically connected to the another part of the circuit unit.

7. The cable of claim 1,
wherein the circuit unit is disposed on the area only in one surface of the circuit board.

8. The cable of claim 7,
wherein the interface includes a plurality of electrodes, a part of the electrodes being arranged on the one surface of the circuit board and electrically connected to the circuit unit, another part of the electrodes being arranged on another surface of the circuit board opposite to the one surface and electrically connected to the circuit unit through via holes.

9. The cable of claim 1,
wherein the another interface provides a plurality of pads arranged in only one surface of the circuit board.

10. The cable of claim 1,
wherein the another interface provides a plurality of pads, a portion of the pads being arranged in one surface of the circuit board and another portion of the pads being arranging in another surface of the circuit board.

11. The cable of claim 10,
wherein the portion of the pads and the another portion of the pads are unevenly arranged along edges of the circuit board.

12. The cable of claim 1,
wherein the connector further provides a housing to enclose the circuit board and the circuit unit therein, the circuit board in one surface thereof has a distance against the housing facing the one surface which is shorter than a distance between another surface of the circuit board and the housing facing the another surface.

* * * * *